INVENTOR
JOHN PAUL JONES, JR.

BY Watson, Cole, Grindle & Watson
ATTORNEYS

INVENTOR
JOHN PAUL JONES, JR.

BY *Watson, Cole, Grindle & Watson*
ATTORNEYS

REED RELAY MATRIX HAVING PRINTED CIRCUIT RELAY CONTROL

Filed Jan. 27, 1965 3 Sheets-Sheet 3

INVENTOR
JOHN PAUL JONES, JR.

BY Watson, Cole, Grindle & Watson
ATTORNEYS

3,365,701
REED RELAY MATRIX HAVING PRINTED CIRCUIT RELAY CONTROL

John Paul Jones, Jr., Wynnewood, Pa., assignor to Navigation Computer Corporation, a corporation of Pennsylvania Filed Jan. 27, 1965, Ser. No. 428,311
11 Claims. (Cl. 340—166)

This invention relates to switching matrix configurations utilizing magnetically operated reed switch relays and more specifically it relates to improvements in such switching matrix configurations for increasing speeds of selecting a particular coordinate path in the matrix for operation and processing high frequency signals such as video signals.

Conventional known matrix arrays, which comprise mechanical cross-bar switches or other forms of relay connections for permitting selection of a particular switch set at the coordinate position designated by selection of operating coils for particular rows and columns, have in the past been limited to very low speed switching applications and have introduced problems in processing high frequency signals. The switching speeds of such systems have been slow because of heavy relay coils having large inductances. Furthermore, the configurations used to interconnect the switch contacts themselves have permitted interaction between various circuits when processing high frequency signals such as used in computer switching circuits or video circuits. In this regard the prior art devices have been complicated and cumbersome in size since closer packing densities tended to increase interference and distortion. In many cases the manufacturing and construction techniques have been complex enough to prevent the construction of a matrix switching device which can be employed at low cost, and particularly for any systems for processing high frequency signals.

All of the foregoing problems of signal processing are amplified by the requirements imposed in using transistors, where very low voltage and current noise levels can cause erroneous operation, particularly in high speed digital data processing circuits. Also the power and voltage requirements of the coordinate selection relays of prior art devices have not been ideal for operation by transistor driving circuits at low voltages. Radiation from inductive flyback voltages incurred in relay operations has also been instrumental in preventing use of relay matrix devices in compact assemblies near transistor circuits or pulse processing systems.

It is accordingly an object of this invention to provide an improved switching matrix assembly and methods of construction by improved manufacturing techniques.

It is another object of this invention to provide a switching matrix assembly utilizing relay coils and movable contacts which can be operated at much higher coordinate selection speeds than heretofore possible.

A further object of the invention is to provide a switching matrix assembly which may be used for processing video and other high frequency signals with little distortion or interference.

Another object of the invention is to provide small and compact type of switching matrix which can be readily manufactured by simple techniques.

A more specific object of the invention is to provide a compact, low-powered switching matrix which utilizes printed circuitry and is capable of providing coordinate selection at transistor voltage and current levels while carrying very low level, high impedance signals at high frequencies without interaction between signal lines.

A further object of this invention is to provide a low powered switching matrix assembly and methods of manufacture which provides a rugged stable environment which is capable of operation in the presence of radiation and other types of hostile environment-type conditions while performing to switch at high speeds various sorts of high frequency signals without danger of erroneous operation.

Still another object of the invention is to provide apparatus and methods of manufacture which may be operated in the presence of transistorized or digital processing circuits without introducing switching transients.

Thus in accordance with the present invention a switching matrix assembly is constructed by affixing a set of coil bobbins by one end to a first printed circuit panel and winding a set of at least two coils on each bobbin with a continuous wire to provide a matrix assembly of rows and columns of bobbins which may be utilized as coils in a switching relay matrix configuration. Magnetic reed switches are inserted within the bobbins for operation whenever current in the two coils together exceeds a predetermined magnetic level which will close the switch contacts, but wherein current in only one of the coils will not be sufficient to close the magnetic switch contacts. A second printed circuit panel is then positioned at the other end of the bobbins with aligned apertures through both panels and the bobbins for receiving the magnetic reed switch assemblies after the bobbin assembly is completed. Each of the printed circuit panels comprises a shielded ground plane on either side of the coil bobbins to produce a completely enclosed array. Furthermore the printed circuit panels contain wiring interleaved with the ground plane to provide transmission line characteristic impedances for both the coil energization circuits and the switching paths. Thus a compact easily assembled array is provided which may be used for faster switching of higher frequency signals. The windings of the coils together with the capacity to the ground planes forms a transmission line with distributed inductance and capacity in such a way that selection of the various coordinate positions can occur in the order of one millisecond. Thus magnetic reed type switches are employed which move a very short distance upon closure under influence of the magnetic field provided by the selected coils in the matrix array. Such switches have infinite open impedance and essentially non-reactive, non-resistive closed impedance for ideal processing of signal paths.

Selection of any one of the switching reeds at the intersection of any row and column in the matrix may be accomplished in accordance with the invention by using transistor driving circuits. In addition the provision of transmission line characteristics in the wiring leading through the reed switches effects a noise and distortion free path for very high frequency video signals or switching impulses.

This package assembly is not only provided by a simplified method of manufacture, but affords improved operation in the presence of noises since it is almost completely shielded from any impulse noises that might be introduced by radiation into the package or out of it, and furthermore because of the consistent transmission line characteristic of the wiring paths throughout the signal paths any cross-talk or noise in the signal paths is eliminated.

Details of the switching matrix assembly and its method of manufacture may be ascertained from the accompanying drawings, wherein.

Figures 5, 6, 7:
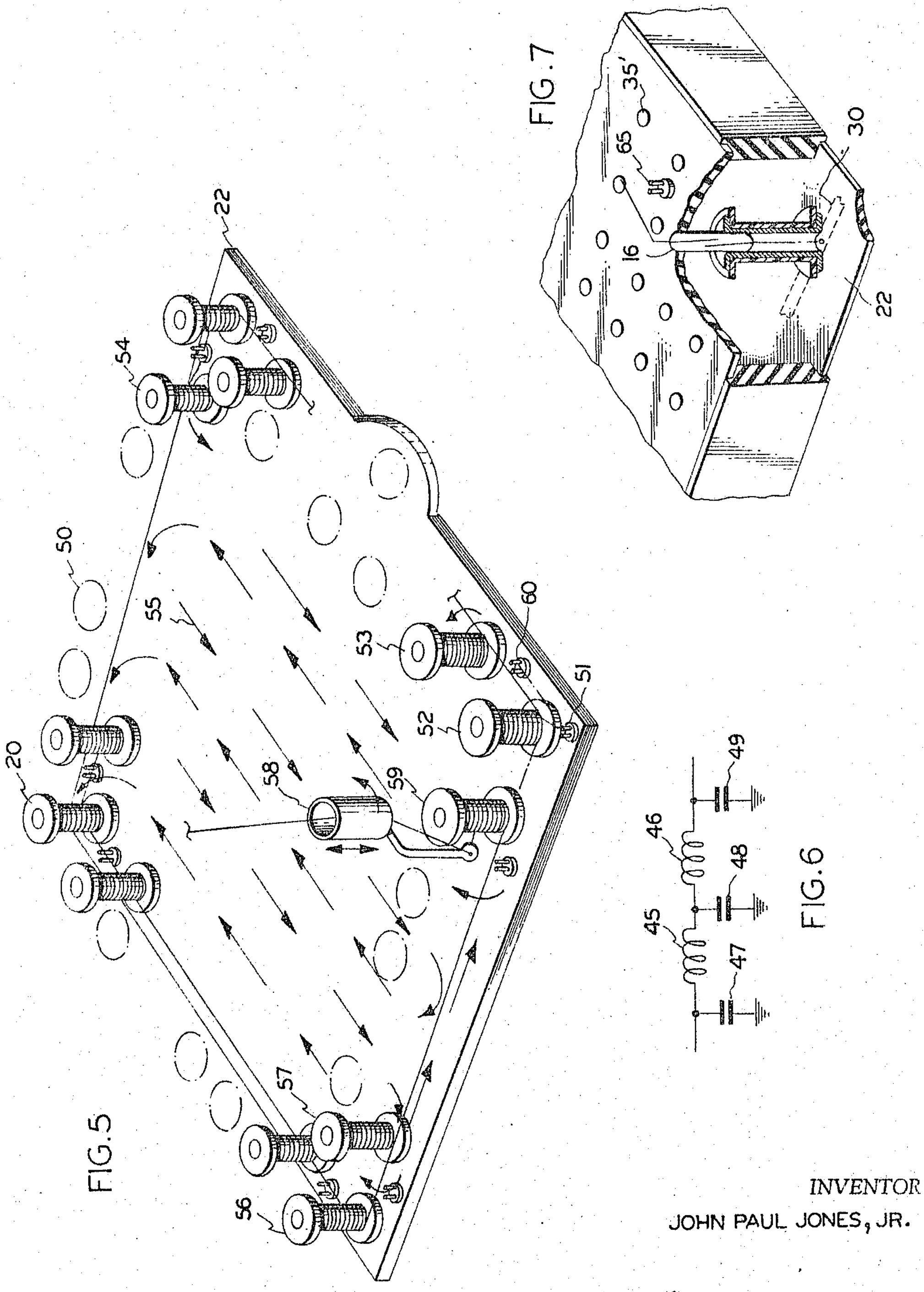
FIGURE 5 is a perspective view of representative bobbins arrayed on a printed circuit panel for winding of coils in accordance with teachings of this invention.

FIGURE 6 is an equivalent circuit diagram of typical coil energization paths afforded in accordance with the constructional techniques of this invention; and FIGURE 7 is a segmental view, partially in section of an assembled switching matrix assembly illustrating the manner in which the magnetic reed switch is introduced in a finished shielded matrix array constructed in accordance with the teachings of this invention.

Figure 1:
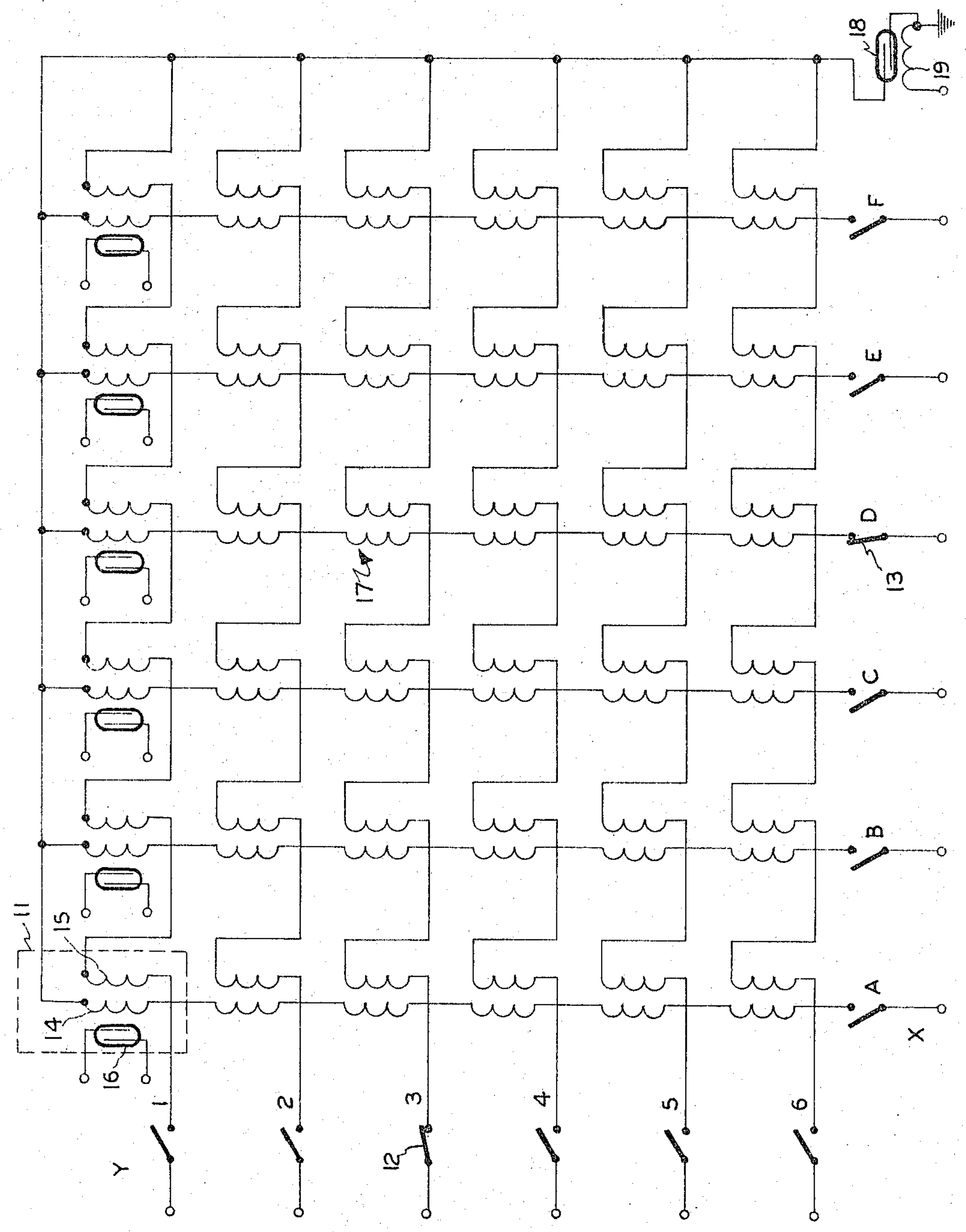
FIGURE 1 is a schematic circuit indicating the mode of operation of the matrix switch assembly.

FIGURE 1 shows the basic electrical diagram of a six by six matrix switching array as afforded by this invention. In this array a relay switching element 11 is provided at each coordinate position defined by intersection of one of the rows Y or columns X. Thus the designated element 11 appears at the intersection of row $Y_1$ and column $X_A$. In this array of six rows and six columns therefore thirty-six elements are provided which may be selected by closing selected switches such as 12 and 13 in the corresponding rows and columns to designate a single selected coordinate intersection 17. Each coordinate element 11, as typified by the top row, comprises a relay with two coils 14 and 15 and a magnetic reed switch 16 hermetically sealed in a glass body. Each coil provides about half enough magnetic flux through the reeds of switch 16, upon corresponding energization through one of the coordinate switches, to close the switch contacts, and when current is supplied through both of the coils 14, 15 associated with the particular reed switch 16 the contacts close. Thus a coincident current selection of each coordinate switch may be made by passing current through all of the coils in a selected horizontal line, which are connected in series, and simultaneously passing current through all of the coil in a selected vertical line, which also are connected in series. In a typical configuration each coil would be wound with two thousand turns of No. 38 copper wire to supply twenty ampere turns to the magnetic reed switch. Each coil would thus have an ohmic resistance of approximately 120 ohms and ten milliamps flowing through this winding would produce twenty ampere turns. Thus each row and column of coils would provide 1200 ohms impedance which when switched across a twelve volt supply would allow ten milliamperes to flow through the line, being entirely consistent with operation by standard transistorized circuits.

The glass reed switches may be selected to close within an ampere turn range of 30 or 35. This provides a large margin of safety so that there is no chance of operating any reed switch with a single row or column current, and the switches will always operate with the combined row and column currents through the respective coils 14 and 15. It is significant that the reed switch relay contacts 16 are movable and the contacts themselves are constructed of magnetic material through which the lines of flux pass. Thus when the reed contacts are open they require 30 to 35 ampere turns to close, but when the contacts are in a closed position they are close together and need not move so they may be held in place against the spring bias tending to hold them open with an ampere turn range of possible 10 to 15. This means therefore that all that is required in this configuration to provide holding or storage of the switch closing is to remove the current from either the row or column while retaining the current in the remaining row or column at the half-current level.

This construction of a matrix switching array provides significant advantage, since the contact closures provide infinite open impedance and very low closing impedance, and the reed switches require very little physical movement for operation at high speeds. Furthermore they are reliable and long lived since they are hermetically sealed within a glass container so that there is very little danger of contact contamination or dust which may provide erroneous switching operation. The switches when closed can carry very low level signals without presenting significant contact impedance, and may carry relatively high currents as compared with the solid state switches for example.

The switching matrix array thus is ideal for providing a very large number of coordinate positions and is not limited to any particular limiting number, although it is sometimes convenient in accordance with the decimal numbering system to provide coordinate arrays of ten columns and ten rows to provide 100 coordinate positions in each plane. These planes can be stacked as many deep as required, for example ten planes stacked on top of each other would provide 1000 coordinate positions. In order to select the planes as well as the rows and columns, some third dimensional selection device must be used. One such selection device might comprise the additional coil 19 which has its contact 18 connected in the ground return circuit for the coils in each of the rows and columns. In this way a selection could not be made in the matrix shown in FIGURE 1 unless the contact 18 were closed. Thus one additional coil and switch relay combination in each plane will provide a means for selecting each matrix plane in a three dimensional array. This particular manner of selection has an advantage of low drive current requirements, since only that current necessary for only one row and column in the selected plane is connected. An alternative manner of making the selection is to provide a common ground return lead for all of the contacts on each plane, which ground return would be selected in the same manner as shown by relay 19. This would then prevent closure of any switching circuit when the contacts were closed in a selected row or column of any plane not selected by closure of relay contacts 18. However, this would require enough driving current to actuate all the rows and columns in a three dimensional array. Further discussion of the various specific advantages of the connection of the coils and relay contacts as afforded by this invention will take place hereinafter.

Figure 2:
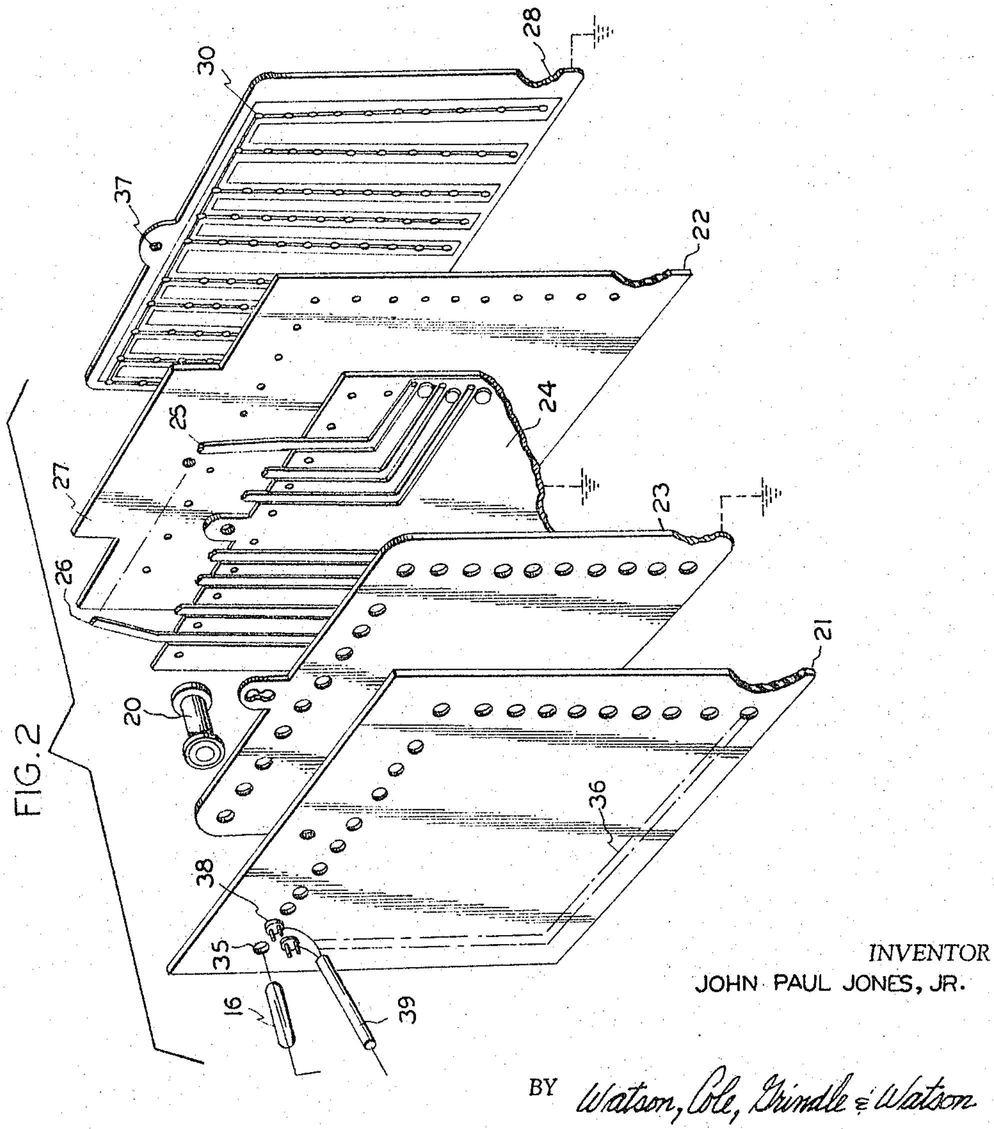
FIGURE 2 is an exploded perspective view of illustrative portions of switching matrix assembly illustrating certain methods and features of construction afforded by this invention.

In FIGURE 2 an assembly diagram of a coordinate array is shown illustrating several important details of construction. The array is shown in exploded perspective form to indicate the relationship of the various parts and representative elements are shown rather than all of the elements on a complete array to avoid unnecessary detail in the drawing which would detract from an understanding of the important relationships of the various items shown. In essence the array comprises a coil bobbin 20 interspersed between a pair of printed circuit panels arrayed for example on insulating boards 21 and 22. The coil bobbin itself at the two extremities contacts grounded conductor planes 23 and 24 at each end to thereby be electrostatically shielded within the assembly so that inductive current impulses will not be radiated from the assembly and to prevent radiation from other sources from entering the assembly. The planes 21 and 23 are shown separated but it is understood that these may be in the form of a conventional printed circuit board where the grounded plane 23 is bonded to the insulating board 21, and likewise the grounded metallic planes 24 and 28 are bonded to the insulating board 22 on opposite sides.

As will be shown later, windings are wound upon the bobbins 20 with a single wire for the series connected row coils and column coils and thereby very few connections need be made from the coils to the panels in this assembly. Conductive wires 25 and 26 serve as external connections to the various row and column coil leads, and are interspersed as shown a fixed distance from the grounded metallic plane 24. These leads terminate in the tab 27 which serves as a connector plug for the matrix assembly.

Figure 3:
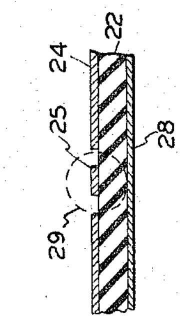
FIGURE 3 is a segmental view of a section of printed circuit board showing a typical wiring path constructed with transmission line characteristics as afforded by the invention.

As shown in FIGURE 3, the configuration of these leads 25 within the grounded metallic sheet 24, and which face on the opposite side of the insulating board 22 a further grounded plane 28, serves to provide a virtual transmission line having the general characteristics of a coaxial cable as signified by the dotted circle 29. This permits the leads to the coils, which might otherwise radiate switching transients, to in effect be completely shielded so radiation from the switching matrix into nearby circuits is precluded.

Figure 4:
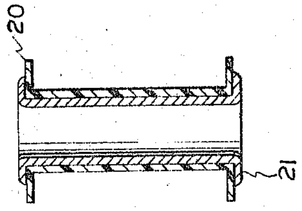
FIGURE 4 is a detailed view of a bobbin assembly in cross section.

The bobbins themselves may be constructed as shown in FIGURE 4 to have an internal metallic coating or insert 21 which makes contact with the grounded planes at each end. Thus when the reed switch 16 is inserted into the bobbin as may be seen from FIGURE 7 for example, it has a fixed dimension with its longitudinally extending leads and the metallic shield 21 so that it may be designed with a fixed characteristic impedance to act also as a transmission line. This feature is quite important in the design of the matrix assemblies since it permits processing of high frequency signals such as video frequencies and very high speed switching signals such as found in computer devices through paths having a fixed impedance and acting as a transmission line.

In furtherance of the establishment of transmission line characteristics for the signals, the grounded plane 28 is utilized with interspersed conductors 30 placed in a particular special relationship with it to provide a fixed termination impedance characteristic on the line 30, which is used as a common return path for each of the switches 16. Input signals may be introduced at coaxial line 39 to provide throughout the array a line having the proper transmission characteristics.

Thus it may be seen from the assembly of FIGURE 2 that a compact assembly of a plurality of bobbins such as a ten-by-ten matrix indicated by the respective outer apertures 35 which are aligned in rows and columns, only part of which are shown, but which are arrayed throughout the board as suggested by the phantom lines 36. The additional plane switching core may be added to make a total of 101 bobbins and for this purpose the tab 37 is tion, the coils may be energized through a connector coupled to plug tab 27, and the 100 entering signal circuits may be connected to terminal plugs 38 supplied upon printed circuit insulating board 21. Thus, almost perfect shielding and impedance matching characteristics are retained throughout the entire matrix array, and it is for this reason that this particular matrix assembly may be used without distorting high frequency video signals.

A further important feature of this assembly is the facility to provide coordinate selection at a very high switching speed. It is required in a great many selection systems to provide selection of a coordinate in at least one millisecond and switching speeds of the order of a thousand cycles can be attained readily with this sort of configuration. It is necessary however to provide some of the distinctive features of this array in order to attain such high switching selection speeds. One such characteristic is illustrated in FIGURES 5 and 6 for example.

As hereinbefore suggested, each of the columns and rows of bobbins are wound with a single wire so that introduction of various impedances and stray circuits at connecting points in between individual coils is eliminated. Also as hereinbefore explained each of the bobbins is in contact with a grounded plane and the bobbins preferably have an internal conductor surface which is grounded thereto. Thus the current path through each of the sets of coils in any particular row or column may have an equivalent circuit configuration as shown in FIGURE 6, where the coils 45 and 46 are associated with certain distributed capacities 47, 48 and 49 to the ground plane. Thus the configuration of the rows and columns of coil is that of a distributed transmission line which permits much higher switching speeds effective at any one of the coils than with a large lumped inductance and capacity as found in conventional arrays with large inductors or inductors not fashioned in the manner disclosed here to attain transmission line characteristics.

Even though the foregoing characteristics of high frequency processing and extremely high speed coordinate selection are favorable, it is also necessary in this sort of an array to provide an assembly that is non-critical in assembly and manufacture and which can be produced at reasonably low cost. One aspect of this additional feature which adds further functional utility to the array is illustrated in connection with FIGURE 5, where the method of winding the bobbins is illustrated.

As explained in connection with FIGURE 6, it is desirable to avoid connections of separate coil bobbins for the purpose of preventing the introduction of various impedances in the desired transmission line characteristic. However it is further desirable to only have to make a single connection at each end of a continuous wire threaded through each row and column. The method of constructing the bobbin plane as illustrated by FIGURE 5 goes even further than this in that all of the windings are made upon all of the coils in an array with a single wire, which may be then cut and affixed to a connection terminal at each end of each row and column to provide the desired coordinate system. Thus each of the bobbins 20 etc. may be affixed to the mounting plane board 22 in a coordinate array as suggested by the showing of several of the bobbins and the phantom intermediate circles 50. The row and column connections may be made to terminal lugs such as 51 interspersed at appropriate positions on the edge of the board where desired.

The continuous wire winding may be anchored for example at starting terminal 51 and may lead to the winding on bobbin 52 and progress up the row of bobbins 52, 53 etc. and back down the row of bobbins 54, 59, etc. and back and forth until all the rows are completed at bobbin 56 through the winding path indicated by the arrows 55. As all of the row windings are completed at the terminal bobbin 56, the same continuous wire is then passed down the columns as indicated by bobbin 56, 57, 59 and 52 to place the second winding thereon. This winding progresses in a similar manner until all of the bobbins have been wound with two coils from a single continuous wire which is provided through the rotating spindle 58 as shown in the process of putting a winding on bobbin 59. When this processing is completed the wire may be cut and soldered to appropriate terminals 60 to provide the necessary row and column interconnection points. In this way the uniformity of the transmission line characteristics may be maintained and the assembly may be constructed economically without the requirement to wind and mount a large number of individual bobbins, or to make connections at a large number of terminals. In this manner uniformity of characteristics is attained without introducing chances of stray connecting impedances at a large number of terminals.

After the bobbin array is thus wound and the top plane is affixed to the opposite ends of the bobbins 20 etc., the glass reed switches 16 may be inserted through apertures 35′, as illustrated by the partial view of FIGURE 7. Thus one end lead of the switch may be introduced into the printed circuit conductor 30 on the bottom side of panel 22, whereas the other end of the switch lead may be inserted in terminal connector 65, and such leads on either end panel may thereafter be dip soldered.

It is seen therefore that the configuration afforded by this invention is extremely simple to manufacture, is very small in size and supplies operational characteristics superior to those attainable by prior art configurations. Accordingly not only is the assembled structure unique and advantageous, but also those methods of manufacture used in attaining the advantageous features of operation are unique and functionally advantageous. Therefore those features which are illustrative of the nature of the invention are defined in particularity in the following claims.

What is claimed is:

1. A switching matrix assembly comprising inner and outer printed circuit panels contacting opposite ends on a set of coil bobbins arranged in rows and columns of a matrix array, apertures through said bobbins and panels, magnetic reed switches extending through said apertures and resting in said bobbins with leads extending through said panels, two coils wound on each bobbin, and printed circuit wiring on said panels coupled to the two coils and the switch leads.

2. An assembly as defined in claim 1 wherein grounded shield planes are formed on said panels at each end of said bobbins.

3. An assembly as defined in claim 2, wherein wiring is interspersed in said shield planes to constitute a transmission line of predetermined characteristic impedance.

4. An assembly as defined in claim 2, including grounded shield members inside said apertures through said coil bobbins.

5. An assembly as defined in claim 2, wherein the impedance of the windings for each row and column are distributed to constitute a transmission line of predetermined characteristic impedance.

6. An assembly as defined in claim 5, wherein one coil on all bobbins in each row and in each column is a single continuous wire.

7. A high speed relay switching matrix for processing high frequency signals comprising in combination, means for mounting a compact set of adjacent coil bobbins in rows and columns of a matrix array between two planar members, a magnetic reed switch operable to close a set of contacts within each bobbin by a magnetic field of predetermined strength and having switch leads extending through said planar members, two coils on each bobbin, means jointly energizing the coils of a selected row and a selected column to identify a single bobbin and produce with energization of two coils thereon a magnetic field greater than said predetermined strength and to produce on other bobbins of said selected row and column a magnetic field through one coil not great enough to close said contacts, and printed circuit connecting means on at least one of said planar members coupled to said switch leads to produce a transmission line with a predetermined characteristic impedance.

8. A matrix as defined in claim 7 wherein a grounded metallic plane element is provided on said planar member on either side of said coil bobbins, and further comprising a metallic shield between said bobbins and their respective reed switches which contacts the two grounded planes.

9. A matrix as defined in claim 7 including printed circuit means on both sides of one of said planar members coupling the coils and switch leads to a plug member thereon.

10. A matrix as defined in claim 7 wherein the rows and columns of bobbins have wound thereon respective sets of said coils in the respective rows and columns from a single continuous wire.

11. A matrix as defined in claim 10 including printed circuit connections on one of said planar members coupled to the single wire of the coils in said rows and columns.

No references cited.

THOMAS B. HABECKER, *Acting Primary Examiner.*

H. PITTS, *Assistant Examiner.*